United States Patent [19] [11] 3,727,463
Intraub [45] Apr. 17, 1973

[54] SHORTED TURN AXIAL DRIVER-SENSOR

[75] Inventor: Julius Intraub, Plainview, N.Y.

[73] Assignee: Kollsman Instrument Corporation, Syosset, N.Y.

[22] Filed: Mar. 18, 1971

[21] Appl. No.: 125,577

[52] U.S. Cl. ................ 73/398 R, 73/407 R, 73/410
[51] Int. Cl. ......................... G01l 9/10, G01l 7/08
[58] Field of Search ............... 73/398 R, 407, 410, 73/386, 71.5; 335/222, 226

[56] References Cited

UNITED STATES PATENTS 3,503,263  3/1970  Intraub ........................ 73/398 R

*Primary Examiner*—Donald O. Woodiel
*Attorney*—E. Manning Giles, J. Patrick Cagney, Michael A. Kondzella and Richard A. Zachar

[57] ABSTRACT

A pressure measuring system utilizes an aneroid capsule as the frequency determining mechanical feedback element of an electrical oscillator, the capsule having closely spaced diaphragm walls, each carrying a separate electromagnetic element cooperating with a separate magnetic yoke assembly. Each electromagnetic element is a copper sleeve defining a shorted turn at its free end that is axially movable in an annular gap defined by the magnetic yoke. Each yoke assembly includes a soft iron core section projecting through a cylindrical pole face to define a radial flux field in the annular gap for coupling with the shorted turn.

12 Claims, 5 Drawing Figures

PATENTED APR 17 1973

INVENTOR
Julius Intraub
BY
J. Patrick Cagney
ATTORNEY

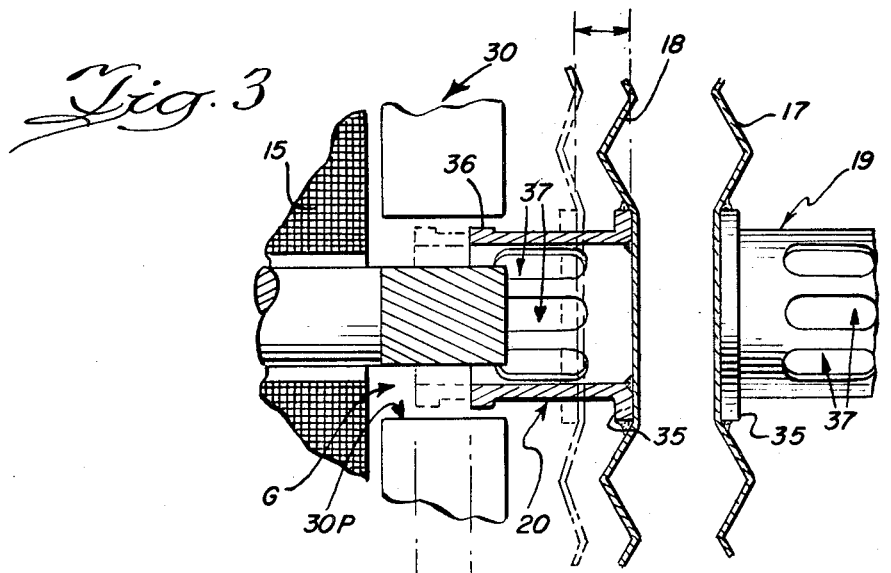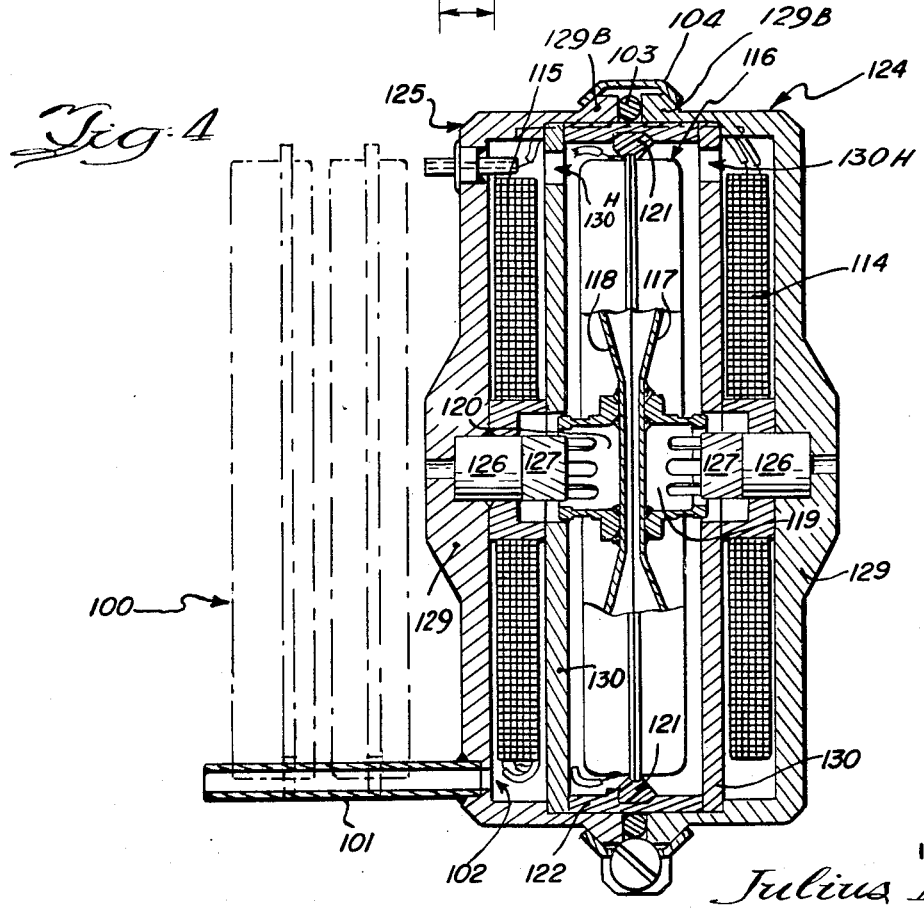

SHORTED TURN AXIAL DRIVER-SENSOR

BACKGROUND OF THE INVENTION

This invention relates to an electromagnetic energy transfer device. For example, the invention is applicable to a pressure transducer of the general type shown in Intraub U.S. Pat. No. 3,503,263 wherein a vibratable capsule carries an electromagnetic element for coupling with a magnetic flux loop to produce precise correlation between diaphragm wall movement and magnetic flux changes.

The coupling between the electromagnetic element and the flux loop is impaired where a load or bias force acts on the movable element, where stray magnetic fields are not controlled, and where the magnetic flux loop is altered due to changes of the reference location of the diaphragm. These problems are aggravated where a pressure capsule having closely spaced diaphragm walls capable of relatively large deflection are employed. Moreover, cross-coupling is particularly troublesome.

SUMMARY OF THE INVENTION

The present invention is concerned with an arrangement for providing electromagnetic energy transfer in a fashion to avoid or minimize the above-noted problems.

More particularly, the invention is concerned with a system that includes a diaphragm wall mounted to vibrate along an axis and comprises an electromagnetic element mounted centrally on the diaphragm to vibrate along the axis in unison therewith, the element having a shorted turn encircling the axis, and a magnetic yoke assembly providing a magnetic flux loop that includes a gap encircling the axis to receive the shorted turn in a radial flux field that symmetrically intercepts the shorted turn.

The arrangement eliminates any load or bias force that would alter the vibration characteristic of the diaphragm wall. In addition, any stray flux fields cannot affect the coupling between the shorted turn and the radial gap. Moreover, the gap is readily shaped in density along any required axial distance.

In certain of the embodiments illustrated herein, the electromagnetic element comprises a sleeve of electrically conductive, non-magnetic material extending concentrically of the axis, the sleeve having one end anchored to the center of the diaphragm and having a set of lengthwise wall slots providing a well-defined shorted turn at its free end. Correspondingly, the magnetic yoke assembly includes a cylindrical core structure projecting axially and having a permanent magnet section and a soft iron section, the yoke assembly including an end wall defining a cylindrical pole face concentrically encircling the soft iron section to define the annular gap.

In another embodiment, the electrically conducting sleeve that serves as the shorted turn type of electromagnetic element has a continuous wall throughout its length, there being no slots therein, and the magnetic yoke assembly has a soft iron core and a ring-like permanent magnet section that is remote from the soft iron core.

The pressure measuring systems disclosed herein incorporate an aneroid capsule having closely spaced diaphragm walls for resonant vibration in opposing synchronism at a frequency determined by the differential gas pressure between inside and outside of the capsule. In accordance with this invention, each diaphragm wall has a separate electromagnetic element and cooperating magnetic yoke assembly interconnected to define an oscillator circuit in which the aneroid capsule serves as the frequency determining element. The lack of bias force on the diaphragm walls, the negligible flux leakage and the avoidance of cross-coupling ensure the condition that the mechanical resonance characteristic of the capsule alone will determine the frequency of oscillation.

A set of accurately mating shoulders on the support and magnetic frame structures enables the entire assembly to be clamped in accurately registered concentric relation.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 3 is an enlarged fragmentary view of the coupling arrangement between the shorted turn and the magnetic yoke;

FIG. 4 is a transverse sectional view, similar to FIG. 2, and showing another embodiment.

Figure 1:
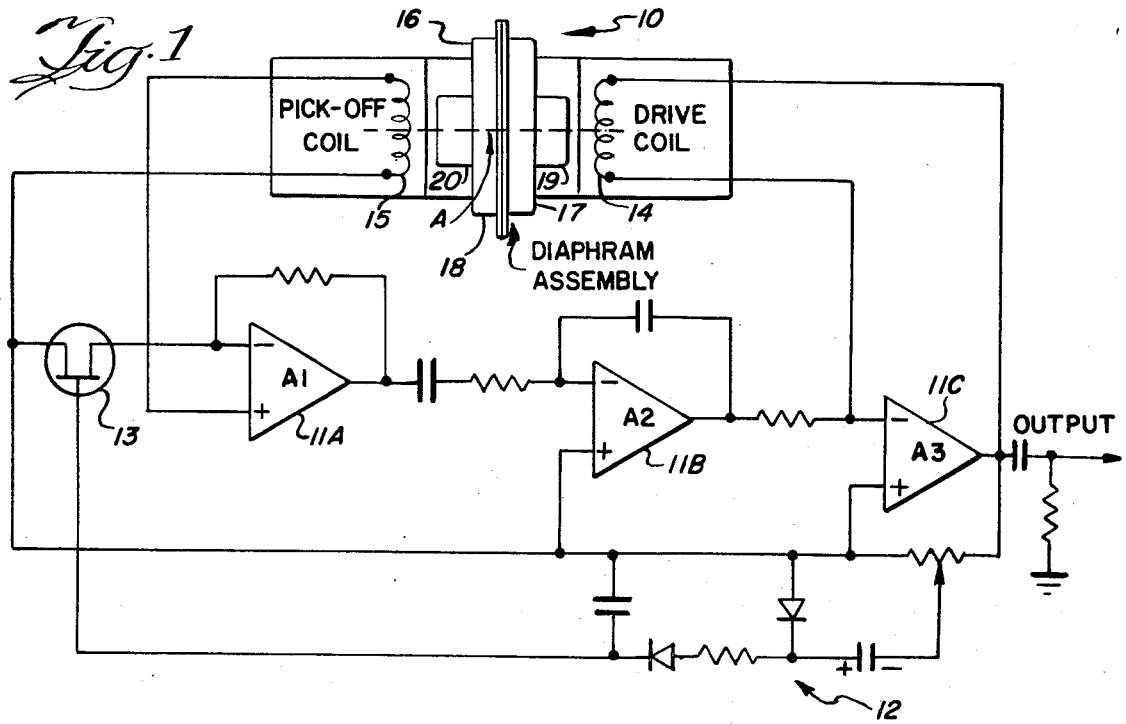
FIG. 1 is a schematic diagram of a pressure measuring system showing a pressure capsule connected as the frequency determining feedback element of an oscillator circuit.

Referring now to the drawings and particularly to FIG. 1, a schematic diagram of a solid state digital-type pressure transducer is shown as including a pressure responsive sensor 10 connected as the frequency controlling element in the positive feedback path of a composite amplifier arrangement comprising three separate amplifiers 11A, 11B and 11C, connected in series to provide the required gain, phase and current drive for enabling sustained oscillation.

An AGC detector circuit 12 is connected to rectify and peak detect the voltage output from the current drive amplifier 11C and is connected to supply feedback voltage to an FET 13 for controlling the variable gain amplifier 11A which is AC coupled to the phase shift amplifier 11B to eliminate DC drift. The phase shift amplifier 11B compensates for phase shift through the feedback path that includes the sensor 10. Amplifier 11C generates a current waveform to energize a drive coil 14 that actuates the sensor 10. A pickup coil 15 is connected to supply input to the amplifier 11A at a frequency preferentially determined by the resonance characteristic of the sensor 10. The composite gain of the arrangement, as controlled by the AGC circuit 12, maintains each amplifier in a linear region for producing a sinusoidal waveform.

The sensor 10 shown in FIG. 1 incorporates a sealed aneroid capsule 16 of the standard electron beam welded construction commonly used in altimeters. The aneroid capsule 16 is mounted to operate essentially under no-load conditions such that its resonant frequency vibration is a function of the differential gas pressure between the interior (vacuum) and the exterior of the capsule.

In the schematic arrangement of FIG. 1, the capsule 16 has mating diaphragm walls 17, 18. The wall 17 carries an electromagnetic element 19 acting as a shorted turn encircling the axis A and electromagnetically coupled to the drive coil 14 of the current drive amplifier 11C that supplies energy necessary to maintain a predetermined amplitude of vibration for the diaphragm wall. The mating diaphragm wall 18 carries an electromagnetic element 20 acting as a shorted turn electromagnetically coupled to the pickup coil 15.

When the circuit is energized, the transients in the output circuit of amplifier 11C act to drive the diaphragm wall 17. The tuning fork action of the capsule 16 causes the companion diaphragm wall 18 to move in opposing synchronism along a common central axis A. The diaphragm walls 17, 18 tend to vibrate at a resonant frequency determined by the pressure differential acting upon each and act to produce a positive feedback for supporting oscillation at that resonant frequency. Accordingly, the signal frequency at the output terminal of the drive amplifier 11C is a measure of the gas pressure to which the capsule is subjected.

Figure 2:
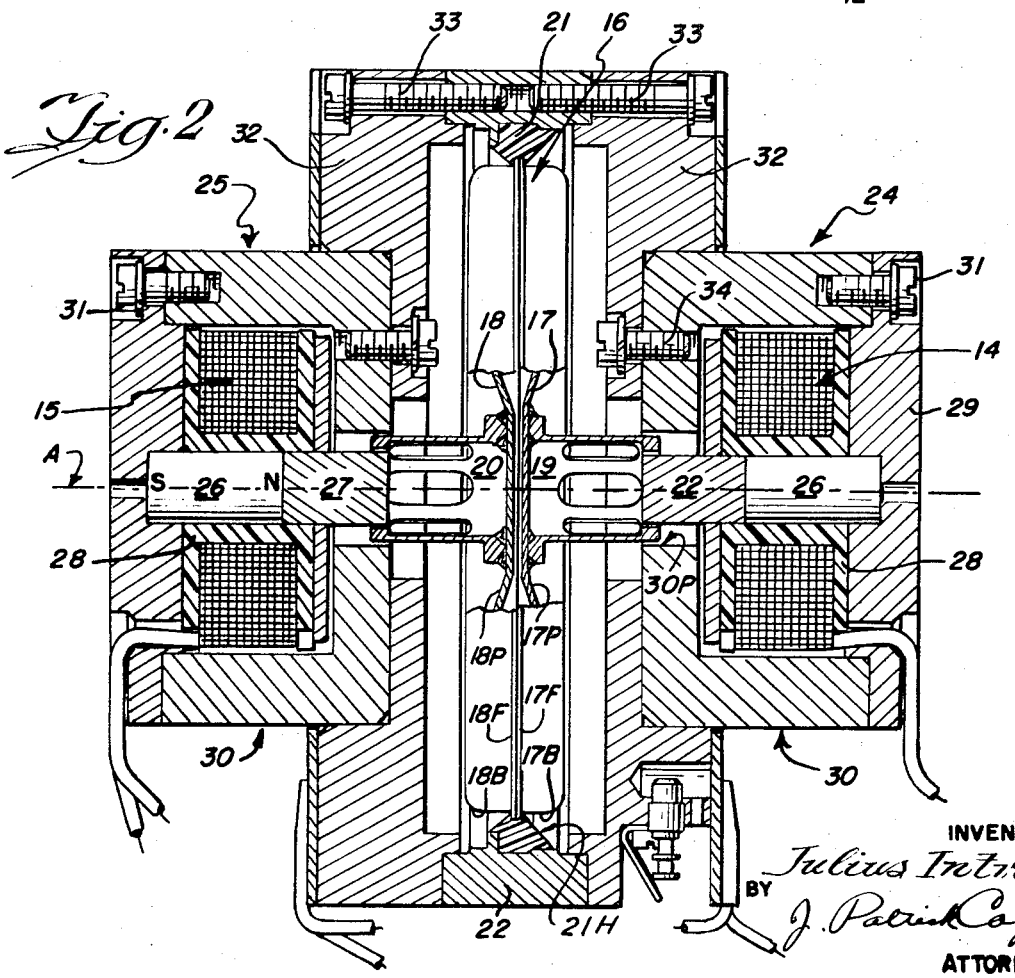
FIG. 2 is a transverse sectional view of the capsule and the electromagnetic energy transfer mechanisms that are coupled thereto in accordance with this invention.

In the embodiment illustrated in FIG. 2, the aneroid capsule 16 is suitably supported at its rim by a continuous ring of rubber seated within a support ring 22 and provided with spaced throughholes 21H to afford pressure equalization. At normal sea level pressure, the diaphragm walls 17, 18 are inwardly dished as shown in FIG. 2. The diaphragm walls 17, 18 vibrate in opposing synchronism in the fashion of the tines of a tuning fork. The displacement of the central wall portions 17P, 18P of the diaphragms varies as a function of external pressure to produce an increase in axial thickness of the capsule as a function of decreasing pressure or of increasing altitude. The configuration of the particular capsule shown herein tends to maximize the displacement of the diaphragms 17, 18 with pressure changes. In particular, the displacement of the central wall portions of the diaphragms is in inverse non-linear relationship to altitude in order to provide an approximately linear readout of capsule resonant frequency with altitude. The resonant frequency of vibration is determined by the configuration of the diaphragms. Change of diaphragm configuration with pressure is accommodated by the bending action of the circumambient bend portions 17B, 18B which connect the mounting flanges 17F, 18F to the main wall portions of the diaphragms. Bending of the circumambient portions 17B, 18B enables an adaptation of the configuration of the main wall portions in response to variations in the pressure differential acting thereon and allows the main wall portions to assume various degrees of dished configuration. The vibration of the central wall portion is accommodated without substantial bodily stretching and therefore with minimum hysteresis effect.

The drive coil 14 is mounted in a magnetic yoke 24 that defines a flux path which is electromagnetically coupled to drive the element 19 and thereby drive the diaphragm wall 17. Correspondingly, the pickup coil 15 is mounted in a magnetic frame 25 that defines a flux path electromagnetically coupled to the element 20 mounted on the other diaphragm wall 18.

In accordance with the present invention, the transfer of electromagnetic energy between the coils 14, 15 and the corresponding shorted turn elements 19, 20 is accomplished with negligible magnetic flux leakage and with substantially no load or bias force imposed on the diaphragm walls, so that the wall motion which is induced and detected is essentially determined only by the mechanical vibration characteristics of the capsule. Thus, only the pressure conditions acting upon the capsule determine the frequency of resonance.

Each magnet frame 24, 25 is shown to include a core structure projecting along the common axis A and consisting of a permanent magnet 26 and an aligned slug 27 of soft iron or similar magnetic material. Each core structure is disposed within a bobbin 28 each of which, in the illustrated embodiment, has a coil (14 or 15) consisting of 3200 turns of No. 36 wire. Each magnetic frame includes a base disc 29 of magnetic material in which the permanent magnet core 26 is seated and a generally cup-shaped magnetic member 30 having a side wall endwise abutting and fixed to the outer marginal region of the base disc 29 by a plurality of fasteners 31. The cup-shaped element has an end wall provided with a circular central hole to define a cylindrical pole face 30P that receives the free end of the soft iron core slug 27 arranged relative to the pole face to define an annular gap G through which a radial magnetic field is provided. The use of soft iron for the core extension slug 27 insures that the radial field is substantially uniform in the axial direction of the magnetic gap G.

In the embodiment disclosed in FIG. 2, the mounting ring 22 for the capsule is clamped between a pair of non-magnetic support rings 32 by a plurality of fasteners 33, the rings having piloted interfitting shoulders for accurately determining the central axis A. Each of the support rings 32, in turn, is fixed to the corresponding cup-shaped magnetic element 30 by a plurality of fasteners 34 to locate the magnetic gaps G in accurate concentric relation to the central axis A.

Each of the electromagnetic coupling elements 19, 20 is illustrated in the form of a copper sleeve soldered in accurately centered relation on the corresponding diaphragm wall for accurate registry with the corresponding magnetic gap G. As best shown in FIG. 3, each copper sleeve has an outboard flange 35 soldered to the diaphragm wall and terminating in an endless flanged end ring portion 36 located within the magnetic gap to function as a shorted one-turn coil. The shorted turns 36, in this particular embodiment, are sharply defined by the provision of lengthwise wall slots 37 in each sleeve, the wall slots 37 terminating in a plane immediately adjacent each radially enlarged shorted turn.

Movement of the shorted turn on the driver element 19 is controlled by the voltage applied to the terminals of the corresponding current coil 14. Flux changes in the magnetic circuit caused by the application of a varying voltage signal are coupled to the shorted turn by transformer action to cause a circumambient rim current to flow therein. The rim current generates a magnetic field which interacts with the bias magnetic field determined by the permanent magnet core to produce axial motor action in harmony with the applied signal. In resonance operation, a substantially pure sine wave at the resonant frequency of the capsule, drives the element 19 through a simple harmonic mode of oscillation.

In resonance operation, movement of the shorted turn on the pickup element 20 on diaphragm wall 18 occurs in opposing synchronism to movement of diaphragm wall 17. The motion of the shorted turn on element 20 within the bias magnetic field provided by the corresponding permanent magnet core 26 causes a circumambient rim current to flow and thereby modulates the magnetic field to generate corresponding signal changes in the coil 15 through transformer action. The induced signals in coil 15 are fed back to the input circuit of amplifier 11A.

The limit positions assumed by the diaphragm wall 18 and the element 20 are shown in FIG. 3 for the case of a pressure transducer embodiment which is to be subjected to atmospheric pressure conditions ranging between 110 inches Hg. and 0.3 inches Hg. (100,000 feet). The sea level positions are shown in full lines and the 80,000 foot positions are shown in phantom lines. The width of the annular pole face 30P bordering the magnetic gap is approximately 0.22 inches, while the radial dimension of the gap is approximately one-sixteenth inch and the axial dimension between the limit positions is approximately 0.10 inch. It should be understood that at any given position determined by the gas pressure differential, each diaphragm oscillates in an axial direction in accordance with the driver current amplitude.

The shorted turn and magnetic gap arrangement in the particular embodiment illustrated herein offers a number of specific advantages. For example, the illustrated pressure capsule 16 has relatively closely spaced diaphragm walls 17, 18 that are acutely subject to the condition that any undesirable stray fields existing on one side of the capsule may couple to the other side of the capsule. The disclosed arrangement provides carefully controlled field configurations to minimize stray field problems. Any stray fields that may exist are not effective to interact or otherwise interfere with the magnetic field action of the other diaphragm wall.

The capsule arrangement has a characteristically large deflection (for example 0.10 inches) with pressure changes, however, in the present arrangement, the shorted turn is free to move axially over a relatively large path while remaining within the gap G. In addition, the radial flux field in the gap is uniform in the axial direction so that the response characteristics are essentially independent of axial position. For different applications, however, the gap configuration may be selected to determine a different flux density profile.

In summary, it may be noted that the negligible flux leakage, the lack of external resonance factors or damping, and the lack of magnetic bias forces or loads on the diaphragm walls, insure that only the physical characteristics of the diaphragm will determine the frequency of oscillation. Thus, in the present arrangement, the gap conditions minimize the possibility of a varying magnetic flux from the drive circuit bypassing the resonant capsule and coupling directly to the pickup circuit as a leakage signal. The leakage signal to resonant signal ratio alters the phase relationship and hence the operating frequency.

While in the preferred embodiment the diaphragm walls are of a bellows or corrugated type and are associated with a sealed chamber, other configurations are contemplated, for example, a substantially flat diaphragm wall can be utilized or the differential of pressure acting on the diaphragm wall may be developed in any desired fashion. In addition, as shown in the aforesaid U.S. Pat. No. 3,503,263, the capsule may consist of a main body cooperating with a single diaphragm. Moreover, the resonant diaphragm may either be incorporated in a self-oscillating circuit as shown in FIG. 1 hereof, or may be embodied in an arrangement wherein a range of frequencies are applied and the resonant frequency point is directly measured by virtue of the characteristic signal response associated with resonance. Such an arrangement is shown in FIG. 4 of the aforesaid patent.

The embodiment illustrated in FIGS. 1 to 3 is in the form of a sub-assembly adapted for mounting in a protective housing that also contains control and temperature compensation circuitry. A more compact embodiment of the invention is shown in FIG. 4 wherein the basic capsule 116 and the magnetic yoke assemblies 124, 125 also serve to mount the temperature compensating and calibrating networks 100. An inlet stub 101 is provided for applying external pressure through an inlet port 102. In the embodiment of FIG. 4, the corresponding structural parts are given identical reference numbers in the 100 series.

Thus, in the embodiment of FIG. 4, each of the magnetic yoke assemblies includes a permanent magnet core 126 and a soft iron core 127 located within self-supporting drive and pick-up coils 114, 115 respectively. The core structures are carried in magnetic base discs 129 that include cylindrical side walls. A magnetic end wall 130 completes each magnetic yoke and has a central hole defining a cylindrical pole face.

The rim of the capsule 116 is seated in a rubber ring 121 disposed in a support ring 122.

The parts of the assembly are fixed in accurately centered relationship by the provision of snugly fitting shouldered portions. Thus, the side walls of the discs 129 have annular recesses to receive the end walls 130 and the support ring 122 in tightly clamped accurately aligned relationship to determine accurate registry of each shorted turn within its corresponding annular magnetic gap. The side walls of the discs 129 terminate in bevel shoulders 129B that receive a seal ring 103 and an external band clamp 104 that locks the parts in sealed relationship.

The end walls 130 are provided with openings 130H and the rubber ring 121 is provided with throughholes to subject the interior of the unit to the external pressure that is applied through inlet stub 101. The embodiment shown in FIG. 4 is of unitary construction and ready for direct mounting without need for a pressure housing.

Figure 5:
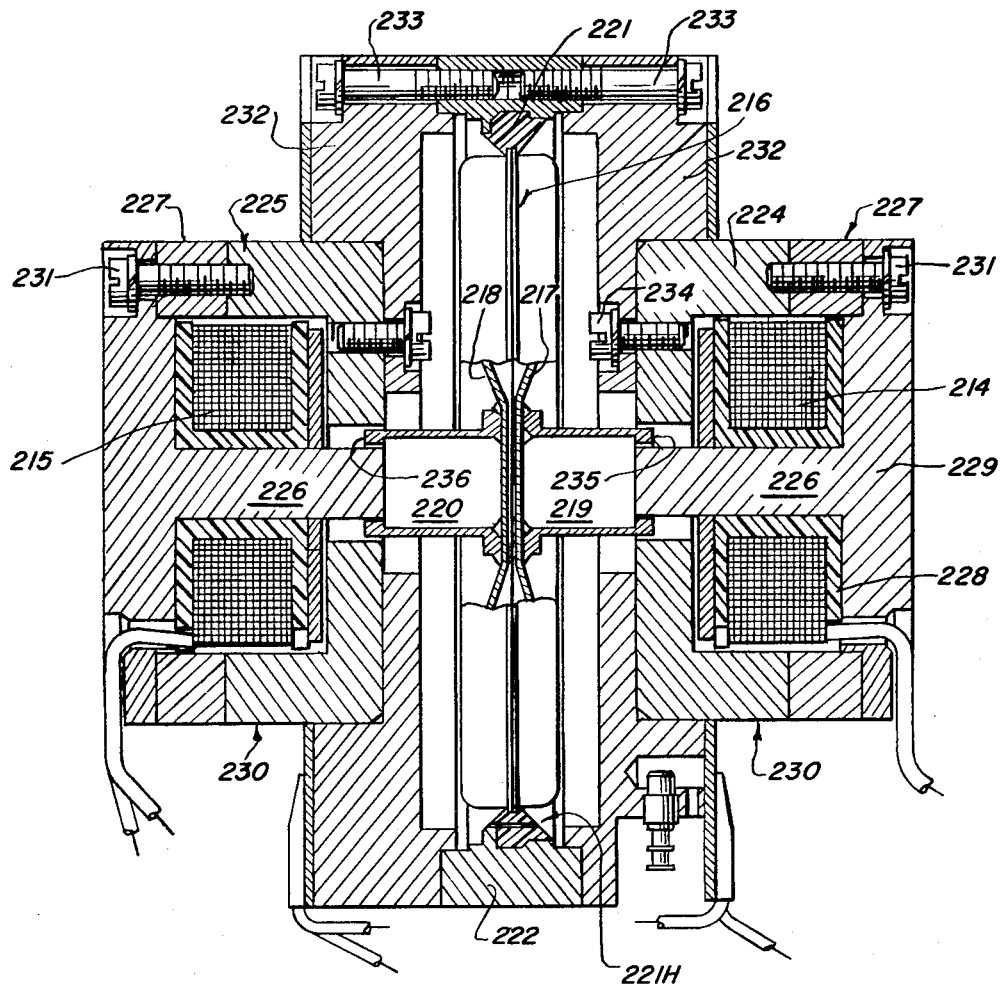
FIG. 5 is a transverse sectional view, similar to FIGS. 2 and 4, and showing a further embodiment.

Another embodiment is shown in FIG. 5 which is mechanically similar to the embodiment of FIG. 2. Corresponding reference numbers in the 200 series are applied to FIG. 5 to designate the elements that correspond to the parts of FIG. 2.

Thus, the capsule is designated 216 and has mating diaphragm walls 217, 218 equipped with shorted turn elements 219, 220, respectively. Correspondingly, the drive coils 214, 215 are mounted in magnetic frames 224, 225, respectively.

In the embodiment of FIG. 5, each of the shorted turn elements 219, 220 is a copper sleeve having a continuous wall, there being no slots such as are shown at 37 in FIG. 3. Each of the copper sleeves 219, 220 terminates in a flanged end turn portion, designated 235 and 236, respectively, located to act within the magnetic gaps to carry substantially the entire induced currents produced by electromagnetic coupling with the flux in the magnet frames.

In the embodiment of FIG. 5, the magnetic frames 224, 225 are arranged to increase the flux coupling with the coils 214, 215. Thus, the core section 226 of each magnet frame is entirely of soft iron, for example, having a permeability of 4000 compared with Alnico which has a permeability of 20. The soft iron ends of the core sections provide the desired radial flux configuration at the magnetic gaps and the soft iron main length portions of the core sections provide the desired low reluctance flux path through the axis of the drive coil to minimize stray or leakage flux paths which link none or only a portion of the drive coils.

To provide permanent bias for the flux system, a ring-shaped permanent magnet 227 is interposed in the outer wall of each cup-shaped magnet frame. The mounting location for each permanent magnet 227, as illustrated herein, minimizes the possibility of stray flux from one flux loop coupling with the other flux loop, thereby enhancing the frequency determining action of the mechanical resonance characteristics of the capsule.

The assembly screws 231 are shown elongated to project through the ring magnet 227 and clamp the magnetic frame elements in the illustrated relationship.

Thus, while preferred constructional features of the invention are embodied in the structure illustrated herein, it is to be understood that changes and variations may be made by those skilled in the art without departing from the spirit and scope of the appended claims.

What is claimed is:

1. In a pressure measuring system that includes a diaphragm subjected to differential gas pressure on its opposite faces, means mounting the diaphragm for resonant vibration along a predetermined axis at a frequency determined by the differential gas pressure, and means responsive in accordance with the frequency of vibration of the diaphragm for producing an output signal representative of the differential gas pressure acting on the diaphragm, the combination of an electromagnetic element mounted to a center portion of said diaphragm to vibrate along said axis in unison therewith, said electromagnetic element having a shorted turn encircling said axis, a magnetic yoke assembly providing a magnetic flux loop that includes a gap encircling said axis to receive said shorted turn and define a radial flux field symmetrically intercepting the shorted turn to synchronize axial movement of the shorted turn with magnetic flux changes in said gap, and electric circuit means including a coil electromagnetically coupled to said yoke assembly for actuating said element to establish resonant vibration thereof.

2. In a system as defined in claim 1 wherein said magnetic yoke assembly includes a cylindrical core structure projecting along said axis and having a main section of permanent magnet material and a cylindrical end section of soft iron material and a cylindrical pole face concentrically encircling the end section to define an annular gap configuration.

3. In a system as defined in claim 2 wherein said magnetic yoke assembly includes a base disc of magnetic material supporting said core structure centrally thereof and a cup-shaped structure having a cylindrical side wall endwise abutting said base disc to surround said core structure and having an end wall provided with a central hole to define said cylindrical pole face.

4. In a system as defined in claim 1 wherein said magnetic yoke assembly includes a cylindrical core structure of soft iron material projecting along said axis to form substantially the entire central leg of the magnetic flux loop, a cylindrical pole face concentrically encircling the core structure to define an annular gap and a ring-shaped permanent magnet interposed in said yoke assembly in concentric outwardly spaced relation to said axis to act in series in said magnetic flux loop.

5. In a system as defined in claim 4 wherein said electromagnetic element comprises a sleeve of electrically conductive, non-magnetic material and extending concentrically of said axis.

6. In a pressure measuring system that includes an aneroid pressure capsule having a set of opposed diaphragm walls for resonant vibration in opposing synchronism along a common axis at a frequency determined by differential gas pressure acting on each diaphragm wall, the combination of a separate electromagnetic element mounted to a center portion of each diaphragm wall to vibrate in unison therewith, each electromagnetic element having a shorted turn encircling said axis, a separate magnetic yoke assembly cooperating with each electromagnetic element, each yoke assembly providing a magnetic flux loop that includes a gap encircling said axis to receive the corresponding shorted turn and define a radial flux field symmetrically intercepting such shorted turn to synchronize axial movement of each shorted turn with magnetic flux changes in the corresponding gap, and oscillator circuit means including a separate coil electromagnetically coupled to each yoke assembly, and means connecting said coils in positive feedback relation to establish oscillation of the oscillator circuit means at a resonant frequency determined by the pressure conditions acting on the capsule diaphragms.

7. In a system as defined in claim 6 wherein each electromagnetic element comprises a sleeve of electrically conductive, non-magnetic material extending concentrically of said axis and having one end anchored to said central wall portion.

8. In a pressure measuring system that includes a pressure capsule having a set of opposed diaphragm walls for resonant vibration in opposing synchronism along a common axis at a frequency determined by differential gas pressure acting on each diaphragm wall, the combination of a separate electromagnetic element mounted to a center portion of each diaphragm wall to vibrate in unison therewith, each magnetic element having an end portion concentric with said common axis, a support ring structure encircling said capsule to hold the capsule in predetermined alignment, said support ring structure having oppositely directed annular shoulders encircling the common axis, and a separate magnetic yoke assembly cooperating with each electromagnetic element, each yoke assembly providing a magnetic flux loop that includes a magnetic gap encircling said axis to receive the end portion of the corresponding electromagnetic element to define a radial flux field symmetrically, intercepting the same to synchronize axial movement thereof with magnetic flux changes in the corresponding gap, said yoke assemblies having oppositely directed annular shoulders mating with the annular shoulders of the support ring structure to locate each magnetic gap in accurate registry with the end portion of the corresponding electromagnetic element and oscillator circuit means including a separate coil electromagnetically coupled to each yoke assembly, and means connecting said coils in positive feedback relation to establish oscillation of the oscillator circuit means at a resonant frequency determined by the pressure conditions acting on the capsule diaphragms.

9. In a pressure measuring system as defined in claim 8 wherein each electromagnetic element comprises a sleeve of electrically conductive, non-magnetic material extending concentrically of said axis and having one end anchored to said central wall portion.

10. In a pressure measuring system as defined in claim 9 wherein each magnetic yoke assembly includes a cylindrical core structure projecting along said axis and having a main section of permanent magnet material and a cylindrical end section of soft iron material and a cylindrical pole face concentrically encircling the end section to define an annular gap configuration.

11. In a system as defined in claim 8 wherein said magnetic yoke assembly includes a cylindrical core structure of soft iron material projecting along said axis to form substantially the entire central leg of the magnetic flux loop, a cylindrical pole face concentrically encircling the core structure to define an annular gap and a ring-shaped permanent magnet interposed in said yoke assembly in concentric outwardly spaced relation to said axis to act in series in said magnetic flux loop.

12. In a system as defined in claim 11 wherein said electromagnetic element comprises a sleeve of electrically conductive, non-magnetic material and extending concentrically of said axis.

* * * * *